US009921058B2

(12) United States Patent
Sinha et al.

(10) Patent No.: US 9,921,058 B2
(45) Date of Patent: Mar. 20, 2018

(54) TRACKING DYNAMIC ON-STAGE OBJECTS (71) Applicant: STMicroelectronics International N.V., Amsterdam (NL)

(72) Inventors: Vikas Kumar Sinha, Haryana (IN); Nishant Omar, Ghaziabad (IN)

(73) Assignee: STMICROELECTRONICS INTERNATIONAL N.V., Schiphol (NL)

( * ) Notice: Subject to any disclaimer, the term of this patent is extended or adjusted under 35 U.S.C. 154(b) by 732 days.

(21) Appl. No.: 14/281,273

(22) Filed: May 19, 2014

(65) Prior Publication Data

US 2015/0330778 A1 Nov. 19, 2015

(51) Int. Cl.
*G01B 21/00* (2006.01)
*G01C 21/16* (2006.01)
*G06K 9/00* (2006.01)
*H05B 37/02* (2006.01)

(52) U.S. Cl.
CPC ............. *G01B 21/00* (2013.01); *G01C 21/16* (2013.01); *G06K 9/00348* (2013.01); *H05B 37/029* (2013.01)

(58) Field of Classification Search
CPC ...... G01B 21/00; G01C 21/16; H05B 37/029; G06K 9/00348
See application file for complete search history.

(56) References Cited

U.S. PATENT DOCUMENTS

| 2001/0022828 A1* | 9/2001 | Pyles | G01C 22/006 377/24.2 |
| 2003/0047683 A1* | 3/2003 | Kaushal | G02B 23/12 250/330 |
| 2010/0184563 A1* | 7/2010 | Molyneux | A43B 1/0054 482/1 |

(Continued)

OTHER PUBLICATIONS

Ben Cochran, et al: "Stage Stalker: Motion Tracking Interface for Use With Moving-Head Spotlights," 2012-2013 Senior Design Capstone Project, Department of Electrical and Computer Engineering, College of Engineering, University of Akron, 1 page, found at http://www.uakron.edu/dotAsset/208c46e3-dc5d-4796-a6fc-f634b2f895a4.pdf.

(Continued)

*Primary Examiner* — Regis Betsch
(74) *Attorney, Agent, or Firm* — Gardere Wynne Sewell LLP (57) ABSTRACT

Methods and systems for dynamic tracking of on-stage objects using microelectromechanical systems (MEMS) presented herein do not require illumination to track a randomly moving object and are easily configurable for various stage sizes and for stages movable relative to the ground. In some instances, a tracking method includes determining an initial state of an MEMS motion tracker carried on a dynamic object, such as a performer. Acceleration and orientation information gathered by the motion tracker is monitored. A change of state in response to the monitored acceleration and orientation information is then determined. An instant state (Continued)

is calculated using the change of state and the initial state. Actuation signals based on the calculated instant state are generated for actuating a gimbal. The gimbal faces a device supported thereby toward the dynamic object.

28 Claims, 4 Drawing Sheets

(56) References Cited

U.S. PATENT DOCUMENTS

| | | | | |
|---|---|---|---|---|
| 2010/0214216 A1* | 8/2010 | Nasiri | ................... | A63F 13/06 |
| | | | | 345/158 |
| 2013/0229512 A1* | 9/2013 | Steffey | ................ | G01B 11/14 |
| | | | | 348/135 |
| 2013/0311134 A1* | 11/2013 | Kordari | ................ | G06F 17/10 |
| | | | | 702/160 |

OTHER PUBLICATIONS

Flament, Bruno et al: "Use of MEMS Motion Sensors for Embedded Mobile Applications," MOVEA, date unknown (5 pages).

* cited by examiner

TRACKING DYNAMIC ON-STAGE OBJECTS

TECHNICAL FIELD

This disclosure relates to microelectromechanical system (MEMS), and in particular, the use of MEMS to track dynamic on-stage objects.

BACKGROUND

In modern stage setups, a spotlight and a camera are used to track a performer on the stage. The position and orientation of the spotlight and camera, the field of projection of the spotlight, and field of view of the camera can all be adjusted to be aimed at the performer such that the performer is presented at about the center of projection or field of view. The spotlight and camera are commonly operated by a human operator. In some situations, a programmable intelligent light system can also be used for projecting light according to a pre-programmed sequence. For example, an intelligent light system employs an actuation gimbal to move a spotlight in a similar manner as a human operator. For use outside of the stage setting, a camera can be supported by a gimbal to become an active surveillance system, for example, to be programmed to carry out patrol movements. Furthermore, optical recognition software may enable active surveillance systems to follow an identified optical target.

SUMMARY

This disclosure presents methods and systems for dynamic tracking of on-stage objects. The disclosed methods and systems do not require illumination to track a randomly moving object and are easily configurable for various stage sizes and for stages movable relative to the ground.

In a first general aspect, a tracking method includes determining an initial state of a motion tracker carried on a dynamic object, such as a performer. Acceleration and orientation information gathered by the motion tracker is monitored. A change of state in response to the monitored acceleration and orientation information is then determined. An instant state is calculated using the change of state and the initial state. Actuation signals based on the calculated instant state are generated for actuating a gimbal. The actuated gimbal causes a device supported by the gimbal to face toward the dynamic object.

In one specific aspect, the tracking method further includes calibrating the motion tracker and the driving controller by setting known parameters corresponding to the initial state in the motion tracker located at an initial reference location.

In another specific aspect, determining the initial state of the motion tracker further includes calculating the initial state using data collected from one of an accelerometer, a gyroscope and a magnetometer within the motion tracker.

In yet another specific aspect, determining the initial state of the motion tracker further comprises calculating the initial state using data collected from the combination of an accelerometer, a gyroscope and a magnetometer within the motion tracker.

In one specific aspect, calculating the instant state further includes determining a present velocity and a present acceleration of the dynamic object. For example, a microcontroller of the motion tracker can output data regarding quaternions, heading, pitch, roll, yaw, linear acceleration, and gravity.

In another specific aspect, the measurement of the change of state further includes sampling data about acceleration and orientation of the motion tracker at a constant frequency.

In yet another specific aspect, the motion tracker is wearable by a human.

In one specific aspect, the motion tracker is a microelectromechanical system including one of an accelerometer, a gyroscope and a magnetometer. The dynamic object is moving in a two-dimensional plane including the initial reference location. The two-dimensional plane is quantifiable in terms of a motion unit pre-defined by the dynamic object. The motion unit is used in the calibration of the motion tracker and a driving controller. For example, the motion unit is a walking step length of a stage performer.

In another specific aspect, the device includes one of a photon emitter, a photon receiver and a sound wave emitter.

In yet another specific aspect, the tracking method further includes transmitting signals about the calculated instant state via a wireless transceiver to a driving controller of the gimbal.

In a second general aspect, a system for tracking a moving dynamic object includes a motion tracker carried on a dynamic object. The motion tracker is set at an initial state and operable to gather data of acceleration and orientation for calculation of an instant state. The instant state can be determined from a change of state. The system further includes a wireless transceiver transmitting signals to a driving controller. The signals can represent the gathered data or the instant state. The system also includes a gimbal controlled by the driving controller. The driving controller generates driving signals from the instant state. The gimbal supports a device and is operable to orient the device to face the dynamic object based on the driving signals sent from the driving controller.

In one specific aspect, the motion tracker and the driving controller are calibrated by setting known parameters corresponding to the initial state when the dynamic object is at an initial reference location.

In another specific aspect, the motion tracker includes one of an accelerometer, a gyroscope, and a magnetometer, or similar MEMS. These sensors gather the data of acceleration and orientation.

In yet another specific aspect, the system further includes a microcontroller operable using the gathered data to calculate instant state. The instant state is calculated by super positioning the change of state to the initial state to determine a present velocity and the present acceleration of the dynamic object. The change of state is sampled about acceleration and orientation of the motion tracker and a constant frequency.

In another specific aspect, the driving controller is configured to process the gathered data to calculate the instant state. The instant state is calculated by superpositioning the change of state to the initial state to determine a present velocity and a present acceleration of the dynamic object. The change of state is sampled about acceleration and orientation of the motion tracker at a constant frequency.

In yet another specific aspect, the dynamic object is a human performer and the motion tracker is wearable by the human performer moving in a two-dimensional plane in an unpredicted pattern.

In a third general aspect, a stage tracking system includes a wearable motion tracker carried by a performer moving on the stage platform of a finite size. The wearable motion tracker includes a microelectromechanical system for gathering data to calculate an instant state of the wearable motion tracker. A driving controller is configured to receive motion signals from the wearable motion tracker and generate control signals based on the motion signals. The motion signals can represent the gathered data or the instant state.

In one specific aspect, the stage tracking system further includes a directional device supported by a gimbal. The gimbal receives the control signals generated by the driving controller and is operable to direct the directional device toward the performer.

In another specific aspect, the wearable motion tracker further includes a microelectromechanical system (MEMS). The MEMS can be an accelerometer, a gyroscope, a magnetometer, and a combination thereof for sampling data for use by a microcontroller. The sampling data can be used to calculate the instant state based on an initial state and a change of state regarding acceleration and orientation. The instant state may be calculated at the microcontroller or at the driving controller. The wearable motion tracker further includes a transceiver for transmitting the motion signals to the driving controller via a wireless connection. The driving controller can generate control signals based on the motion signals to actuate the directional device to track the moving performer.

Other aspects, features, and advantages will become apparent from the following detailed description when taken in conjunction with the accompanying drawings, which are part of this disclosure and which illustrate, by way of example, principles of the disclosure.

DETAILED DESCRIPTION OF THE DRAWINGS

This disclosure presents methods and systems for tracking dynamic on-stage objects. The methods and systems allow for user-friendly calibration, configuration, and absence of illumination, and can track any on-stage moving object using a spotlight, a camera, a directional speaker, or other similar directional devices. The dynamic tracking methods and systems include, for example, a motion tracker, an aiming system, a wireless communication network and a remote controller. During operation, an on-stage performer wears (or otherwise carries) the motion tracker, for example, in part of his/her costume. The motion tracker is calibrated and wirelessly sends signals to the aiming system for describing the movement of the motion tracker. The aiming system includes a gimbal supporting a device such as a spotlight and is actuated to face the device toward the motion tracker. The methods and systems are capable of operating at low or no light conditions and are easily configurable for different stage sizes without implementing additional sensing devices on the stage platform besides the motion tracker. Details of the dynamic tracking methods and systems are described below.

Figure 1:
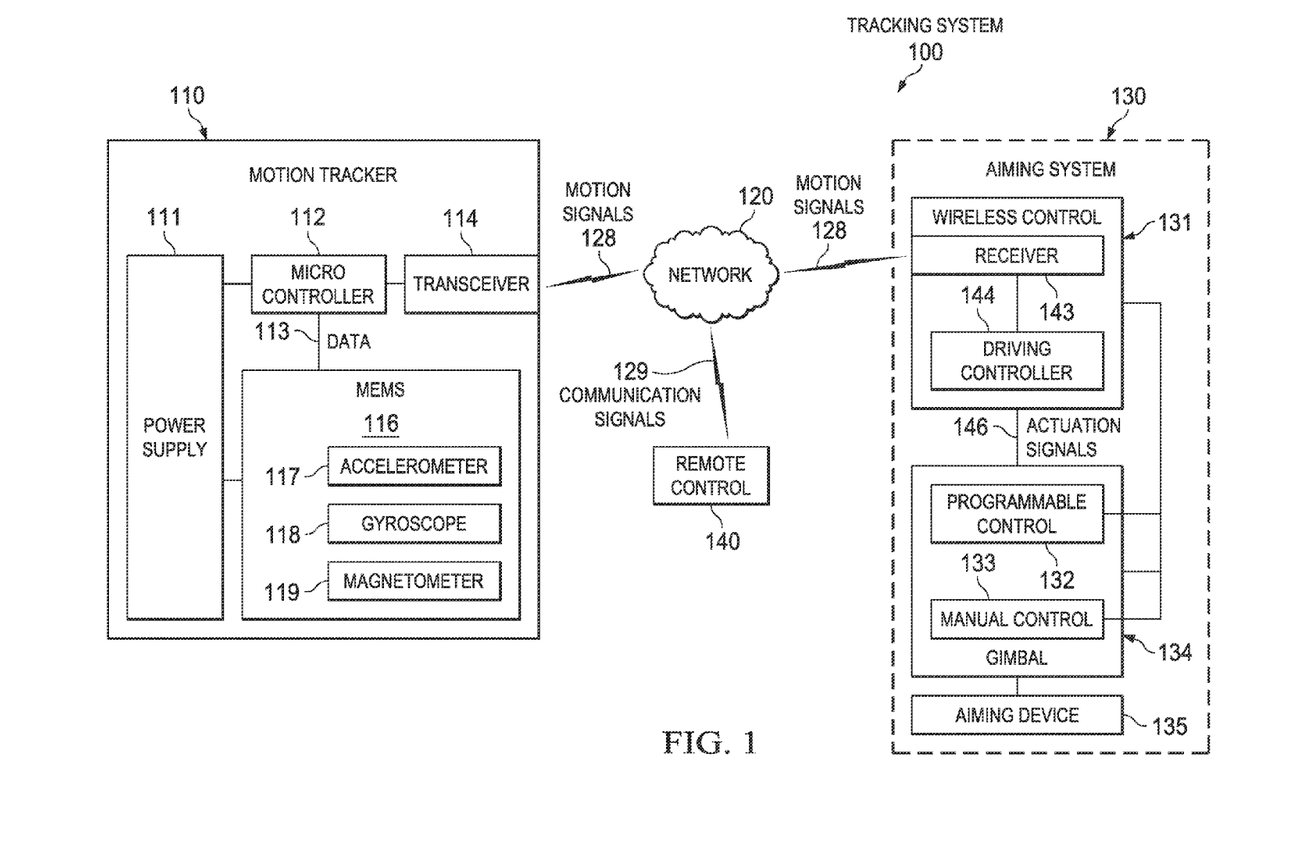
FIG. 1 is a schematic block diagram of a tracking system.

FIG. 1 is a schematic block diagram of a tracking system 100. The tracking system 100 functions to track dynamic on-stage objects moving unpredictably. The tracking system 100 includes a motion tracker 110, an aiming system 130 and a remote control 140, all connected via a network 120. The motion tracker 110 includes a microelectromechanical system (MEMS) 116 for sensing positional changes of the motion tracker 110 and can be packaged into a small and wearable size (such as a pocket size). For example, a performer can clip the motion tracker 110 to the costume or with other wearable devices such as a microphone, goggles, or a wrist-watch. In some implementations, the motion tracker 110 can be integrated inside with the aforementioned devices. In some other implementations, the motion tracker 110 is a standalone item and can be carried in a pocket during operation.

At a high level, the motion tracker 110 reports its movement to the aiming system 130. The movement of the motion tracker 110 can be described using the change of location-and-orientation relative to a known initial location-and-orientation, the current location-and-orientation, or both. In one example, the change of location-and-orientation is sent to the aiming system 130 and compared with the known initial location-and-orientation to determine the current location-and-orientation. In another example, the current location-and-orientation is determined at the motion tracker 110 such that the aiming system 130 can use the current location-and-orientation information without additional data processing. Based on the current location-and-orientation, the aiming system 130 actuates a gimbal 134 to aim an aiming device 135 at and to follow the motion tracker 110 (and therefore its wearer). FIG. 1 presents a schematic description of hardware required for the tracking system 100. Details of methods of operation of the tracking system 100 are presented in FIG. 2.

As illustrated in FIG. 1, the motion tracker 110 includes a power supply 111, a microcontroller 112, a transceiver 114 and the MEMS 116. The power supply 111 provides power to the microcontroller 112, the MEMS 116 and the transceiver 114. The power supply 111 can include a battery, a solar cell, a generator, a power converter for converting alternate current to direct current or a combination thereof. In the examples of this disclosure, the power supply 111 is a set of rechargeable batteries providing a predetermined operating voltage and current to the motion tracker 110.

The MEMS 116 gathers and sends data 113 to the microcontroller 112. The data 113 is gathered from one or more of an accelerometer 117, a gyroscope 118 and a magnetometer 119 of the MEMS 116. The accelerometer 117 measures proper acceleration in one or more axes. For example, the accelerometer 117 can be a single-axis or multi-axis model to detect magnitude and direction of proper acceleration as a vector quantity. Therefore the accelerometer 117 can sense orientation, coordinate acceleration, vibration, shock, and other quantities.

The gyroscope 118 can measure orientation of the motion tracker 110. For example, the gyroscope 118 is a MEMS based model, such as a Coriolis vibratory gyroscope. The gyroscope 118 can include gyroscopic sensors for multiple axes. In some implementations, the MEMS 116 incorporates multiple gyroscopes 118 and accelerometers 117 (or a multi-axis gyroscope 118 and a multi-axis accelerometer 117) to achieve output data of six degrees of freedom. Such implemented package may also be regarded as an inertial measurement motion unit (IMU).

The magnetometer 119 can measure magnetization of a magnetic material, and can measure the strength and direction of magnetic field at a point in space. In some implementations, the magnetometer 119 can function as a miniaturized compass for detecting orientation of the motion tracker 110 relative to the Earth's magnetic field or any known reference magnetic field.

Although the MEMS 116 is illustrated as having all three of the accelerometer 117, the gyroscope 118, and the magnetometer 119, the MEMS 116 may also be implemented as a combination of one or more of these components. For example, the MEMS 116 may only include: one multi-axis accelerometer 117; one single-axis accelerometer 117 and one gyroscope 118; one single-axis accelerometer 117 and one magnetometer 119; or one gyroscope 118 and one magnetometer 119.

The microcontroller 112 communicates with the MEMS 116 for data 113 acquisition and processing. For example, the microcontroller 112 may gather data 113 from the MEMS 116 at a predefined sampling frequency, such as 100 to 20,000 Hz. In other examples, the microcontroller 112 may sample the data 113 at a variable frequency for power preservation purposes. The data 113 measured and collected from the MEMS 116 are processed at the microcontroller 112 using a predefined algorithm, such as a sensor fusion algorithm. For example, the MEMS 116 collects the data 113 relating to 3-axis earth magnetic field, 3-axis linear acceleration, and 3-axis angular rate from the accelerometer 117, the gyroscope 118 and the magnetometer 119.

The data 113 is then processed at the microcontroller 112 using the sensor fusion algorithm that outputs quaternions, heading, pitch, roll, yaw, linear acceleration and gravity information describing movement of the motion tracker 110. Such output information describes both linear and angular motion of the motion tracker 110. In some embodiments, these quantities are further processed at the microcontroller 112 to determine an accumulation of a change of distance and direction relative to an initial known reference location, for obtaining the current location and orientation. The current location and orientation can be sent to the aiming system 130 as motion signals 128 via the transceiver 114 and the network 120. In other embodiments, these quantities may be directly sent, via the transceiver 114 and the network 120, as motion signals 128 to the aiming system 130 for data processing using the resources therein.

In some implementations, the microcontroller 112 is a processor or processing unit, such as an application-specific integrated circuit (ASIC). For example, the microcontroller 112 can be an integrated circuit customized for tracking data processing, and in particular, to process data 113 collected from the MEMS 116 using standard or proprietary algorithms to output current acceleration and orientation of the motion tracker 110, such as the magnitudes and directions of the time-dependent acceleration and orientation. Though not illustrated in FIG. 1, the microcontroller 112 includes microprocessor(s) and memory block(s) including ROM, RAM, EEPROM, flash memory, and other large building blocks. In other instances, the microcontroller 112 can be a general purpose processing motion unit programmed to process data 113 collected from the MEMS 116.

The transceiver 114 includes both a transmitter and a receiver combined and sharing common circuitry or housing. The transceiver 114 can be based on radio frequency, telephony, Ethernet, or other applicable wireless technologies. For example, the transceiver 114 may use radio frequency modules, cellular network, or Wi-Fi network, or a combination thereof for wireless communication. In one example implementation, the transceiver 114 is a Bluetooth transceiver for exchanging data using short-wavelength UHF radio waves in the ISM band. In other implementations, the transceiver 114 may adopt IEEE 802.3 as frame data format for wireless Ethernet communication.

The network 120 is a computer network providing wireless communication among the motion tracker 110, the remote control 140, and the aiming system 130. The network 120 may apply any appropriate wireless technologies, such as radio and spread spectrum technologies, cellular radio communication technologies, terrestrial microwave technologies, communication satellites, or others, that correspond to the configuration of the transceiver 114. For example, the network 120 can be a local area network (LAN) using a high-frequency radio technology (Wireless LAN). The wireless LAN may use spread spectrum technology (e.g., IEEE 802.11) to enable communication between multiple devices in a defined area. In some implementations, the network 120 may be an existing network such as a cellular or Wi-Fi network in the operation area. In some implementations, the network 120 may be a specific establishment dedicated for the communication within the tracking system 100.

The remote control 140 sends communication signals 129 to the motion tracker 110. For example, the remote control 140 can send commands to power on, calibrate, initiate, and power off the motion tracker 110 and the aiming system 130. The remote control 140 may be a standalone device having a power supply, a user interface, and a transceiver to communicate with the motion tracker 110 and the aiming system 130 via the network 120. In some implementations, the remote control 140 may also communicate directly with the motion tracker 110 regardless of the network 120. In other instances, the remote control 140 may be an add-on to a primary device, such as a laptop computer, a smartphone, a tablet, or other applicable devices. Detail about the use of the remote control 140 is further described below.

The aiming system 130 includes a wireless control 131, a programmable control 132, a manual control 133, the gimbal 134, and the aiming device 135. The gimbal 134 provides moving freedom to the aiming device 135. For example, the gimbal 134 provides at least two degrees of rotational freedom, such as pitch and yaw, to the aiming device 135. In some implementations, the gimbal 134 further includes mechanisms for translating the aiming device 135 in three-dimensional space, such as an x-y-z coordinate. In some implementations, the gimbal may provide a full six-degree-of-freedom to the aiming device 135. In addition, the gimbal may control a field of projection or a field of view of the aiming device 135, such as zooming in and out by adjusting optical elements in the aiming device 135. These movements and actuations of the gimbal 134 may be controlled by one or a combination of the wireless control 131, the programmable control 132, and the manual control 133.

The wireless control 131 controls the aiming system 130 using signals received from the motion tracker 110. The wireless control 131 includes a receiver 143 and a driving controller 144. The receiver 143 receives the output information of the microcontroller 112 from the transceiver 114 via the network 120. For example, the receiver 143 is configured to a corresponding network communication to the transceiver 114 and the network 120. The receiver 143 relays the received output information to the driving controller 144. Although illustrated as a receiver, the receiver 143 may also include a transmitter for sending synchronization signals to the transceiver 114 for verifying a synchronous operation.

The driving controller 144 interprets the output information from the transceiver 114 into actuation signals 146 for controlling the gimbal 134 for tracking using the aiming device 135. For example, the actuation signals 146 include values indicating the amount of movement about each degree-of-freedom. The driving controller 144 continuously interprets the output information in real time or without any significant delay in time.

The programmable control 132 provides an automated option for controlling the gimbal 134. For example, a user may program an actuation sequence for the gimbal 134 regardless of external input. For example, during calibration of the aiming system 130, an initial aiming location may be defined for the aiming device 135. The programmable control 132 can reset the aiming device to aim at the initial aiming location regardless of the current status of the aiming device 135. In some embodiments, the programmable control 132 may also include actuation instructions for retracting the aiming device to a stand-by mode.

The manual control 133 enables a human operator to use the aiming system 130 or to interfere with the wireless control and the programmable control when errors in those controls are present. For example, the manual control 133 may be an override function selectable on an interface (not shown) with the aiming system 130. In some implementations, the wireless control 131, the programmable control 132, and the manual control 133 may all be selected as responsive with a priority ranking For example, the programmable control 132 may have a higher priority ranking than the wireless control 131 and can override the wireless control 131 when commanded (e.g., by the remote control 140 or at the user interface of the aiming system 130). When an operator is present, the manual control 133 may have the highest priority ranking and can override other controls.

The gimbal 134 has multiple actuators each actuating movement in one degree-of-freedom. For example, the gimbal 134 can actuate movements in all three translational and rotational directions, such as forward-backward, up-down, left-right, roll, yaw, and pitch. The gimbal 134 may further be integrated with the aiming device 135 for zooming actuation, for example, the field of view or field of projection of the aiming device 135 can be adjusted. In some implementations, the gimbal 134 may include less numbers of actuators than that of a full six-degree-of-freedom actuation mechanism. For example, the gimbal 134 may only include actuators for pitch, yaw, and zoom actuation.

The aiming device 135 can be, for example, an LED light, an incandescent light, a fluorescent light, or any other photon emitting device. The aiming device 135 can also be a photography camera, a video camera, a camcorder, or any other photon receiving device. The aiming device 135 can further be a directional audio speaker, or other applicable aiming device.

Figure 2:
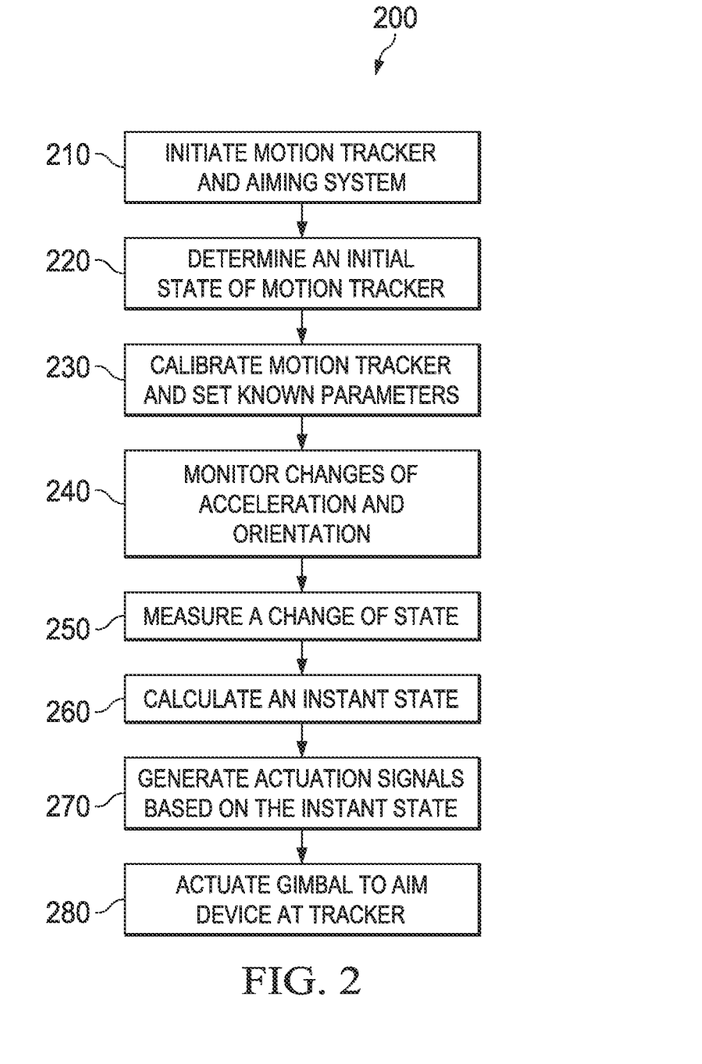
FIG. 2 is a flow chart for a method of system operation of the tracking system illustrated in FIG. 1.

FIG. 2 is a flow chart 200 for a method of system operation of the tracking system 100 of FIG. 1. At step 210, the motion tracker 110 and the aiming system 130 are initiated. The remote control 140 may send signals to both the motion tracker 110 and the aiming system 130 for initialization. The initialization includes powering on the motion tracker 110 and the aiming system 130 and setting or resetting parameters to default values (e.g., values of the most recent configuration). For example, the initialization can clear any history data or setting that may affect the current operation. In some implementations, the initialization can also be individually controlled by interfaces on the motion tracker 110 and the aiming system 130. For example, a user may input an initialization command at the motion tracker 110, which relays the initialization command via the transceiver 114 and the network 120 to the aiming system 130. Further, such initialization function can invoke normal operation mode from system stand-by mode and therefore allows for power-saving stand-by function when the tracking system 100 is not in operation.

At step 220, an initial state of the motion tracker 110 is determined. The initial state includes an initial motion state and an initial location state. The initial motion state includes data of initial acceleration and orientation of the MEMS 116. For example, the motion tracker 110 may initially be subjected to gravity, which varies according to specific geographical conditions (such as altitude and latitude). The motion tracker 110 may also be carried on a dynamic object on a moving reference frame (such as worn by a user on a bus, a train, a ship or an airplane). In general, the initial motion state describes the starting condition of the motion tracker 110 in the current operation session. For example, the initial motion state includes the present velocity and the present acceleration of the dynamic object. The initial location state includes data related to the motion tracker 110 being at an initial reference location. For example, the initial location state is determined using known parameters corresponding to setting the aiming system 130 to aim at the initial reference location. Details of determining the initial location state is discussed in the calibration step 230.

The initial motion state can be calculated using data collected at the MEMS 116, such as the data collected from one of the accelerometer 117, the gyroscope 118 and the magnetometer 119. The accelerometer 117 measures the proper acceleration; the gyroscope 118 measures changes in orientation and the magnetometer 119 measures orientation relative to a known magnetic field. In some implementations, the initial motion state can be determined using all such data of a full six degrees of freedom. In other implementations, the initial motion state can be determined using a sub-combination of such data, for example, using data only from the accelerometer 117, using data only from the gyroscope 118, using data from the accelerometer 117 with the gyroscope 118 or the magnetometer 119, using data from the gyroscope 118 with the magnetometer 119 or other sub-combinations.

At step 230, the motion tracker 110 is calibrated and set with known parameters. The known parameters are corresponding to the determined initial state (e.g., initial location state) when the motion tracker 110 is at the initial reference location designated for calibration. In practice, a user carries the motion tracker 110 to move within a known area (such as a stage) covered by the aiming system 130. A selected location (such as the entrance) of the known area can be designated as the initial reference location where the aiming system 130 can be configured to track the motion tracker 110. Detailed calibration procedure is illustrated in the flow chart of FIG. 5.

Figure 5:
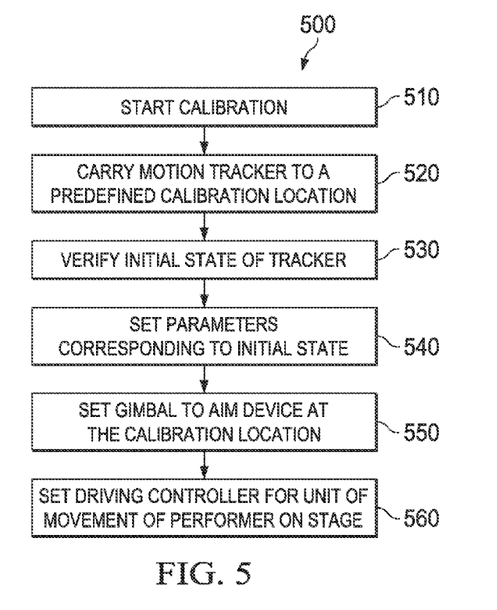
FIG. 5 is a flow chart for an example method of calibration procedure of a tracking system.

Briefly turning to FIG. 5, a flow chart 500 for the calibration procedure is illustrated. At step 510, the calibration is started after both the motion tracker 110 and the aiming system 130 have been initialized. At step 520, the motion tracker 110 is carried by a user (e.g., a performer) to a predefined calibration location. At step 530, the initial state (e.g., the initial motion state) of the motion tracker 110 is verified. For example, the microcontroller 112 properly records the initial state indicates a global proper acceleration (e.g., gravitational acceleration, platform acceleration, etc.) and orientation (e.g., initial orientation). The initial state is reported to the aiming system 130 and the remote control 140 for the verification. At step 540, parameters related to initial location state are set in the motion tracker 110 in correspondence to gathered data related to the initial reference location.

At step 550, the aiming system 130 is configured with a set of known parameters related to the initial location state to face the aiming device 135 toward motion tracker 110 at the calibration location. The aiming system 130 uses the set of known parameters as a start reference point for future movement. At step 560, the driving controller 144 is set with a motion unit of movement specific to the performer in the stage area. For example, the driving controller 144 controls the gimbal 134 to cover the stage area using coordinated actuation (such as rotating in pitch and yaw) relative to the start reference point in increments according to the motion unit of movement, such as in motion units of foot, meters, walking step length, or the like. This motion unit will be used at 270 by the driving controller 144 for controlling the gimbal 134.

Returning to FIG. 2, at step 240, acceleration and orientation of the motion tracker 110 is monitored. For example, the microcontroller 112 samples data from the MEMS 116 at a constant frequency, such as 100 to 20,000 Hz. The sampled data is then processed for the acceleration and orientation and output to the wireless control 131 via the transceiver 114 and the network 120. With registered time information, the microcontroller 112 can process the acceleration and orientation data into velocity and distance relative to the initial reference location.

At step 250, a change of state of the acceleration and orientation is measured at the microcontroller 112. For example, the microcontroller 112 may regularly report the change of state for certain time intervals (regardless if actual change of state has occurred), or may use certain criteria to determine what constitutes a change of state, such as when the change in acceleration or orientation exceeds a threshold setting.

At step 260, an instant state is calculated using the change of state and the initial state. The instant state is an overall description of the current position, velocity, and acceleration of the motion tracker 110. The current position of instant state can be calculated by superpositioning the data describing the change of position in the change of state to the initial location of the initial state, wherein the change of position includes integration of velocity data over time. The velocity of the instant state can be calculated by superpositioning data describing the change of velocity in the change of state to the initial velocity of the initial state, wherein the change of velocity includes integration of acceleration data over time. In a general aspect, superpositioning the change of state to the initial state includes performing vector operations using data collected at the MEMS 116 starting at the initial state to when the instant state is called.

The instant state can be calculated at the microcontroller 112 or at the driving controller 144. For example, the microcontroller 112 can process the data 113 into motion signals 128 representing the instant state, which is sent via the transceiver 114 and the network 120 to the wireless control 131. In a different implementation, the motion signals 128 include raw data 113 and are sent to the wireless control 131 for processing. The processed instant state generally describes the current velocity, relative distance to the initial reference location, and acceleration of the dynamic object.

At step 270, actuation signals 146 are generated based on the instant state. The driving controller 114 interprets the instant state into actuation instructions for the gimbal 134. For example, the dynamic object is moving in a two-dimensional plane that is quantifiable in terms of the motion unit predefined by the dynamic object. As used in the calibration at 230 of the motion tracker 110 and driving controller 144, the motion unit can be foot, meters, a walking step length of a stage performer, or any other customized length motion unit. The driving controller 144 produces actuation commands in terms of such motion unit based on the present velocity and acceleration of the motion tracker 110.

At step 280, the gimbal 134 aims the aiming device 135 at the motion tracker 110 based on the actuation signals 146 issued by the driving controller 144. The aiming actuation allows for an error tolerance for proper tracking of the dynamic object. For example, when the aiming device 135 is a spotlight, the field of projection is adjusted to 4 to 5 times of the motion unit. The field of projection is also adjusted by the gimbal 134 when the dynamic object is moving closer or further with respect to the aiming device 135. In a similar manner, when the aiming device 135 is a camera, the field of view is also adjusted for an error tolerance that is about 3 to 5 times of the motion unit. Dynamic tracking is performed such that the dynamic object remains approximately at the center of the field of projection or the field of view. This aiming operation may be terminated when the dynamic object returns to its initial reference location, when the time duration is reached; or when a termination command is received and the motion tracker 110, the aiming system 130, or both.

Figure 3:
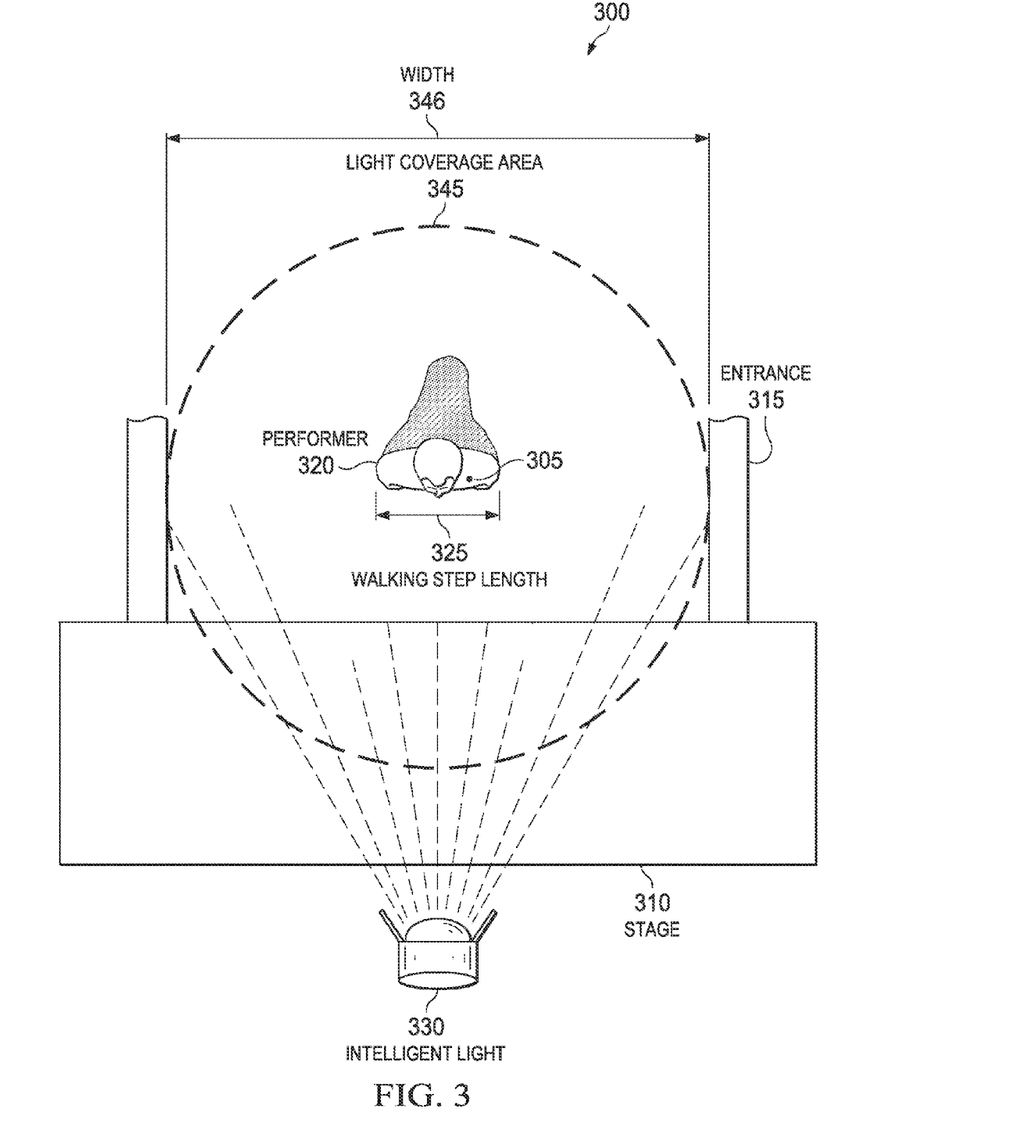
FIG. 3 is a schematic top view of an example stage tracking system.

FIG. 3 is a schematic top view of an example stage tracking system 300. The stage tracking system 300 can track a moving dynamic object 320, which in this example is a human performer 320. The performer 320 carries a motion tracker 305 and will be moving on the stage 310 in a random manner. The stage 310 is a platform that generally defines a two-dimensional plane. An intelligent light 330, or any appropriate directional devices, will track the movement of the performer 320 by casting a spotlight having a light coverage area 345 on the performer 320. The performer 320 has a walking step length 325, (e.g., a fixed dimension of the performer, such as the performer's shoulder width as shown in FIG. 3), which may be about a fifth to a third of the width 346 of the light coverage area 345. The stage 310 has a finite size definable by the walking step length 325 as a measurement unit.

During operation, the motion tracker 305 is set at an initial state when the performer 320 stops at the entrance 315. The entrance 315 is an initial reference location that allows the motion tracker 305 to configure both the initial motion state and the initial location state. The stage tracking system 300 is then calibrated by setting known parameters to motion tracker 305 and the intelligent light 330. The known parameters register the initial position and location (e.g., as the initial location state) of the performer 320.

Similar to the general flow chart 200 of FIG. 2, in this particular embodiment, the motion tracker 305 measures a change of state by monitoring changes of acceleration and orientation using MEMS sensors, such as a set of accelerometer, gyroscope, and magnetometer. A microcontroller of the motion tracker 305 further calculates an instant state by superpositioning the change of state to the initial state. The microcontroller is operable to calculate the instant state to determine the present velocity and a present acceleration of the performer 320. For example, the microcontroller samples data for the change of state at a constant frequency, such as 100 to 20,000 Hz.

The motion tracker 305 includes a wireless transceiver that transmits signals about the instant state via a wireless network to the intelligent light 330. A driving controller of the intelligent light 330 receives the instant state and generates driving signals for a gimbal of the intelligent light 330. The gimbal then orients the intelligent light 330 to face the performer 320 using the continuously updated actuation signals sent from the driving controller.

In some embodiments, the instant state is determined at the driving controller. Motion signals including the gathered data from the MEMS sensors are wirelessly transmitted from the wireless transceiver to the driving controller of the aiming system for data processing, in which the instant state is determined. Using the instant state, the driving controller then generates driving signals for the gimbal of the intelligent light 330. The gimbal then orients the intelligent light 330 to face the performer 320 using the continuously updated actuation signals sent from the driving controller.

Figure 4:
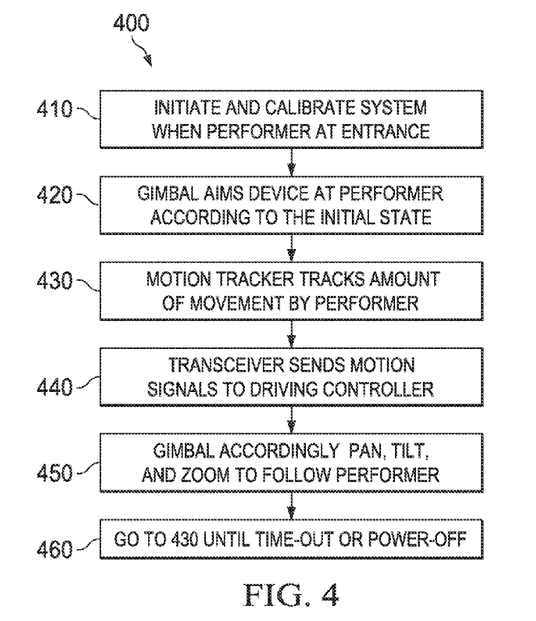
FIG. 4 is a flow chart for a method of system operation of the stage tracking system illustrated in FIG. 3.

FIG. 4 is a flow chart for an example method of system operation of the stage tracking system 300 illustrated in FIG. 3. At step 410, the stage tracking system 300 is initiated and calibrated when the performer 320 stops at the entrance 315. At step 420, the gimbal of the intelligent light 330 is configured to aim its spotlight at the entrance 315 and is set with parameters correspond to the initial location state determined at the wearable motion controller 305. At step 430, the motion tracker 305 actively measures data that describes the amount of movement by the performer 320. For example, the movement by the performer 320 can be measured by integrating velocity data over time relative to the entrance 315.

At step 440, the transceiver of the motion tracker 305 sends motion signals to the driving controller of the gimbal of the intelligent light 330. The motion signals may include the data measured by the motion tracker 305 or the calculated instant state processed at the motion tracker 305. When the motion signals include the data measured by the motion tracker 305, the motion signals will further be processed at the driving controller. Eventually, the instant state at the driving controller can include data about a processed current location or data about yet processed change of location relative to the initial reference location, depending on system configuration and setup.

The instant state is then interpreted into actuation commands that describe movement actions for the intelligent light 330. At step 450, the gimbal of the intelligent light 330 accordingly pan, tilt, and zoom the spotlight to follow the performer 320. At step 460, the operation procedure loops back to step 430 and cycles through steps 432 to 450 until the tracking system 300 is timed out, powered off, or manually terminated.

Although this stage tracking system 300 is illustrated using the intelligent light 330, a camera system may also be used (e.g., replacing the spotlight with a camera that can also be zoomed in and out). Similarly, even though FIG. 3 illustrates a stage platform 310, any definable area may be used in a tracking system 300, such as a room, a compartment, a backyard, a garage, or other similar areas.

In the foregoing description of certain embodiments, specific terminology has been chosen for the sake of clarity. However, the disclosure is not intended to be limited to the specific terms selected, and it is to be understood that each specific term includes other technical equivalents which operate in a similar manner to accomplish a similar technical purpose. For example, although in the examples discussed above, only one motion tracker 110 and one aiming system 130 are shown, the tracking system 100 may include multiple motion trackers and multiple aiming systems for multiple performers. For example, there may be a same number of motion trackers each tracked by the same number of aiming systems. There may also be multiple aiming systems tracking a single motion tracker. For example, multiple aiming systems having different aiming devices placed at different locations all track the same motion tracker. There may also be a single aiming system tracking multiple motion trackers. For example, a single aiming system may track multiple motion trackers in turn for a predetermined period of time. Other variations are possible.

In this specification, the word "comprising" is to be understood in its "open" sense, that is, in the sense of "including", and thus not limited to its "closed" sense, that is the sense of "consisting only of". A corresponding meaning is to be attributed to the corresponding words "comprise", "comprised" and "comprises" where they appear.

In addition, the foregoing describes some embodiments of the disclosure, and alterations, modifications, additions and/or changes can be made thereto without departing from the scope and spirit of the disclosed embodiments, the embodiments being illustrative and not restrictive.

Furthermore, the disclosure is not to be limited to the illustrated implementations, but to the contrary, is intended to cover various modifications and equivalent arrangements included within the spirit and scope of the disclosure. Also, the various embodiments described above may be implemented in conjunction with other embodiments, e.g., aspects of one embodiment may be combined with aspects of another embodiment to realize yet other embodiments. Further, each independent feature or component of any given assembly may constitute an additional embodiment.

What is claimed is:

1. A method, comprising:
   determining an initial state of a motion tracker carried on a performer during a calibration, the performer moving in a manner representable using a two dimensional plane, wherein the two dimensional plane is quantifiable with a motion unit in terms of a fixed dimension of the performer and the fixed dimension is statically measured during the calibration of the motion tracker and a driving controller;
   monitoring acceleration and orientation information gathered by the motion tracker;
   determining a change of state in response to the monitored acceleration and orientation information;
   calculating an instant state using the change of state and the initial state; and
   generating by the driving controller of actuation signals based on the calculated instant state to control actuation of a gimbal supporting a device to cause the device to face the device toward the performer.

2. The method of claim 1, further comprising calibrating the motion tracker and the driving controller and setting known parameters corresponding to the initial state in the motion tracker when the performer is at an initial reference location.

3. The method of claim 1, wherein determining the initial state of the motion tracker further comprises calculating the initial state using data collected from one of an accelerometer, a gyroscope, or a magnetometer within the motion tracker.

4. The method of claim 1, wherein determining the initial state of the motion tracker further comprises calculating the initial state using data collected from a combination of an accelerometer, a gyroscope and a magnetometer within the motion tracker.

5. The method of claim 1, wherein calculating the instant state further comprises determining a present velocity and a present acceleration of the performer.

6. The method of claim 5, further comprising generating data regarding quaternions, heading, pitch, roll, yaw, linear acceleration, and gravity.

7. The method of claim 1, wherein determining the change of state further comprises sampling data about acceleration and orientation of the motion tracker at a constant frequency.

8. The method of claim 1, wherein calculating the instant state comprises superpositioning the change of state to the initial state wherein the superpositioning includes accumulating the change of state in a period of time onto the initial state for determining a change of location relative to a known location.

9. The method of claim 1, wherein the motion tracker is wearable by a human.

10. The method of claim 1, wherein the motion tracker is a microelectromechanical system including one of an accelerometer, a gyroscope and a magnetometer.

11. The method of claim 1, wherein the device comprises one of a photon emitter, a photon receiver, or a sound wave emitter.

12. The method of claim 1, further comprising transmitting signals about the calculated instant state via a wireless transceiver to a driving controller of the gimbal.

13. The method of claim 1, wherein the actuation signals include parameters for controlling the device to generate a field of projection or to obtain a field of view having an error tolerance about three to five times of the motion unit.

14. The method of claim 13, wherein the parameters for controlling the device for controlling the device to generate the field of projection or the field of view control a zoom of the device.

15. The method of claim 1, wherein the fixed dimension is measured at an entrance from the shoulder width of the performer.

16. The method of claim 15, wherein the shoulder width of the performer is substantially similar to the foot to foot distance of the performer when the performer stands at the entrance.

17. A system for tracking a moving dynamic object, the system comprising:
a motion tracker carried on a dynamic object, the motion tracker being set at an initial state and operable to gather data of acceleration and orientation for calculation of an instant state, the instant state being determined from a change of state;
a wireless transceiver transmitting signals to a driving controller, the signals representing the gathered data or the instant state;
a gimbal controlled by the driving controller generating driving signals from the instant state; and
a device supported by the gimbal,
wherein the driving signals generated by the driving controller cause the gimbal to operate to orient the device to face the dynamic object, and
wherein the dynamic object moves in a manner representable using a two dimensional plane quantifiable using a fixed dimension of a performer carrying the dynamic object, the fixed dimension is statically measured from the performer during the calibration and used as a motion unit to quantify the two dimensional plane.

18. The system of claim 17, wherein the motion tracker and the driving controller are calibrated by setting known parameters corresponding to the initial state when the dynamic object is at an initial reference location.

19. The system of claim 17, wherein the motion tracker comprises one of an accelerometer, a gyroscope, and a magnetometer for gathering the data of acceleration and orientation.

20. The system of claim 17, further comprising a microcontroller operable using the gathered data to calculate the instant state by superpositioning the change of state to the initial state to determine a present velocity and a present acceleration of the dynamic object, wherein the change of state is sampled about acceleration and orientation of the motion tracker at a constant frequency.

21. The system of claim 17, wherein the driving controller is configured to process the gathered data to calculate the instant state by superpositioning the change of state to the initial state to determine a present velocity and a present acceleration of the dynamic object, wherein the change of state is sampled about acceleration and orientation of the motion tracker at a constant frequency.

22. The system of claim 17, wherein the dynamic object is a human performer and the motion tracker is moving in a non-predicted pattern.

23. The system of claim 17, wherein the driving controller, using the driving signals, controls the device generate a field of projection or to obtain a field of view having an error tolerance about three to five times of the fixed dimension of the performer.

24. The system of claim 23, wherein the driving signals cause the device to generate the field of projection or the field of view by controlling a zoom of the device.

25. A stage tracking system comprising:
a wearable motion tracker carried by a human performer moving in a manner representable in a two dimensional plane of a finite size, the wearable motion tracker including a microelectromechanical system for gathering data to calculate an instant state of the wearable motion tracker; and
a driving controller configured to receive motion signals from the wearable motion tracker and generate control signals which control operation of a gimbal that supports a directional device to cause the directional device to face towards the human performer, the motion signals representing the gathered data or the instant state, wherein the two dimensional plane is quantifiable using a fixed dimension of the human performer and the fixed dimension is statically measured from the performer during the calibration.

26. The stage tracking system of claim 25, wherein the microelectromechanical system further comprises:
an accelerometer, a gyroscope, and a magnetometer for sampling data to calculate the instant state, wherein calculation of the instant state is based on an initial state and a change of state regarding acceleration and orientation; and
a transceiver for transmitting the gathered data to the driving controller via a wireless connection to actuate the directional device to follow the moving performer using projection or reception.

27. The stage tracking system of claim 25, wherein the driving controller, using the driving signals, controls the device generate a field of projection or to obtain a field of view having an error tolerance about three to five times of the fixed dimension of the performer.

28. The system of claim 27, wherein the driving signals cause the device to generate the field of projection or the field of view by controlling a zoom of the device.

\* \* \* \* \*